(No Model.) 2 Sheets—Sheet 1.
J. N. DAGES.
ELASTIC TIRE.
No. 606,378. Patented June 28, 1898.
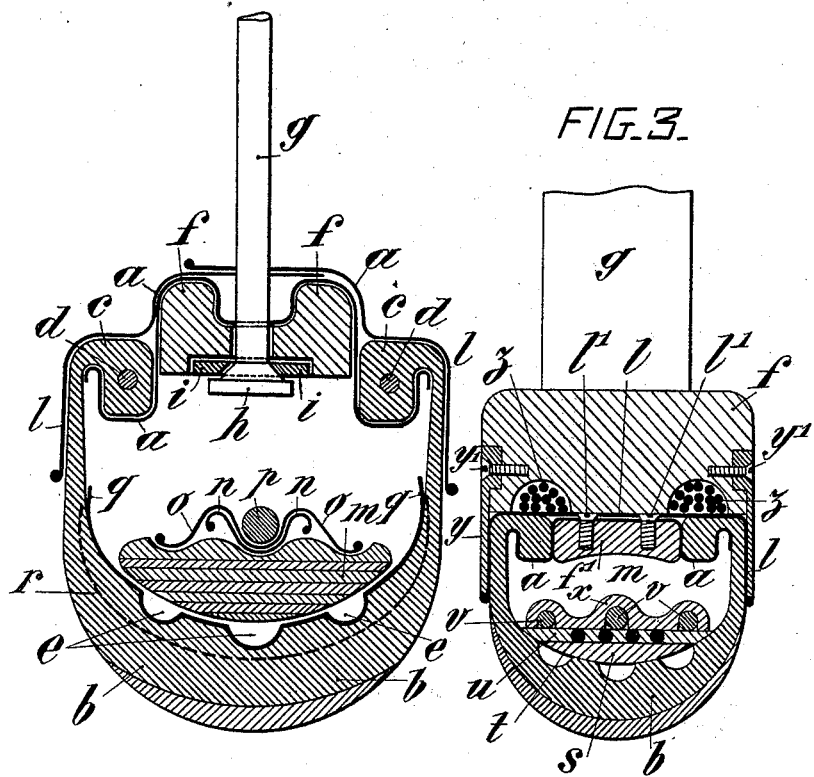
Witnesses:
E. K. Bolton
O. W. Mumms
Inventor:
Jules Noel Dages
By [signature]
his Attorneys.

(No Model.) 2 Sheets—Sheet 2.
J. N. DAGES.
ELASTIC TIRE.
No. 606,378. Patented June 28, 1898.
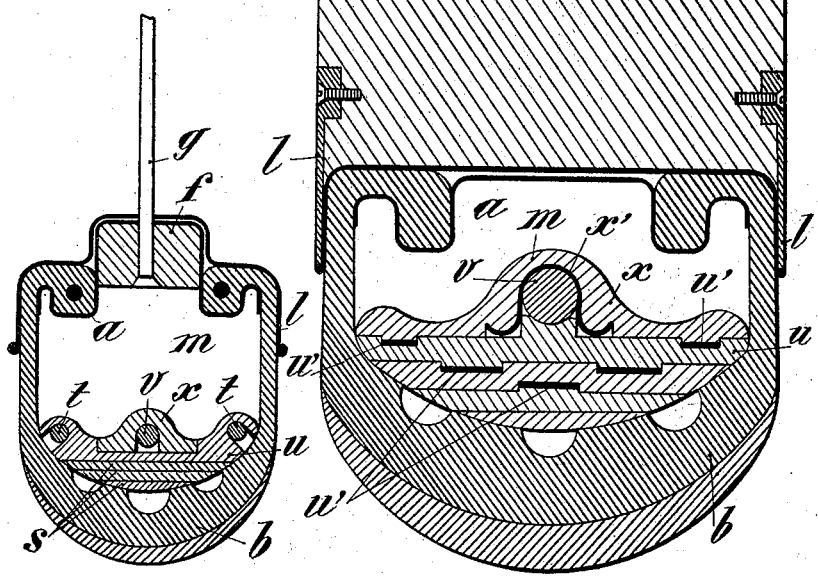

UNITED STATES PATENT OFFICE.

JULES NOËL DAGES, OF PARIS, FRANCE.

ELASTIC TIRE.

SPECIFICATION forming part of Letters Patent No. 606,378, dated June 28, 1898.

Application filed January 12, 1898. Serial No. 666,732. (No model.)

*To all whom it may concern:*

Be it known that I, JULES NOËL DAGES, of 6 Rue de Chateaudun, Paris, in the Republic of France, have invented Improvements in and Relating to Elastic Tires, (for which I have filed patent applications in France on the 15th of June, 1897; in Germany on the 30th of July, 1897; in England on the 29th of July, 1897; in Austria on the 3d of August, 1897; in Hungary on the 4th of August, 1897; in Russia on the 26th of July, 1897; in Belgium on the 2d of December, 1897; in Spain on the 7th of December, 1897; in Italy on the 6th of December, 1897; in Switzerland on the 4th of December, 1897; in Sweden on the 9th of December, 1897; in Norway on the 10th of December, 1897, and in Tunisia on the 11th of December, 1897,) of which the following is a full, clear, and exact description.

This invention relates to an improved wheel-tire characterized principally by the employment of a vibrator ring or hoop which at the same time supports the outer casing or cover of the tire internally.

My invention will be readily understood from the following description with reference to the accompanying specimen drawings, in which—

Figure 1 shows my improved tire as constructed more particularly for use on velocipedes. Fig. 2 is a modification thereof. Fig. 3 shows a complete tire for use on cabs. Fig. 4 shows a tire for use on omnibuses.

As shown in Fig. 1 of the drawings, my improved tire consists, essentially, of a metallic rim or felly $a$, which holds the cover $b$ in position by means of its ribs or projections $c$, in each of which is arranged a cable, cord, or the like $d$.

The cover $b$, which is made with longitudinal grooves $e$, is provided internally with a lining of fabric $g$, arranged on the bias, and with a tissue of tape or ribbon or plaited or woven whalebone $r$ let into or molded in the india-rubber. In the interior of rim $a$ is placed a ring $f$ of wood, which prevents the rim from being distorted under the tension of the spokes $g$ and resists the shearing action of the heads $h$ of the said spokes, which rest against a metallic rim $i$. The rim $a$ and the ribs or projections $c$ of the cover, as well as a part of the said cover, are protected by auxiliary fellies $l$, arranged one on one side and the other on the other side of the said cover and which are secured to the ring $f$ by means of screws. In the interior of the cover $b$ is arranged a vibrator $m$, formed from strips of wood arranged with the grain running in different directions or by coiling or rolling on itself a strip of wood coated with glue. The ring $m$ thus produced is formed into the desired shape as regards cross-section and then covered with cloth. It preferably also comprises a metallic ring $o$ and finally a crown of steel $p$, arranged on the inside. From what has been said above it will be seen that the rim or felly $a$, the ring $f$, and the auxiliary fellies $l$ offer an elastic and strong resistance and prevent the wheel from distortion, while obviating the shearing action of the spoke-heads.

The vibrator-ring $m$ stretches the cover $b$ and insures elasticity in rolling. In the modification shown in Fig. 2 the vibrator ring or hoop is formed by a primary ring $x$, receiving a cable $v$. This ring is let into a second ring $u$, provided with cables $t$, and, finally, three thicknesses of wood $s$ complete the hoop. In the arrangement shown in Fig. 3 for use on the wheels of cabs the wood ring $f$ is provided with metal wires $z$, rolled up in a groove. This arrangement, moreover, comprises lugs or side pieces $y$, secured in position by means of screws $y'$ and serving to support the cover $b$ laterally.

The two metallic fellies $a$ and $l$ are retained on the ring $f$ by means of screws $l'$. The first ring $x$ of the vibrator ring or hoop contains three cables $v$, the second ring $u$ is reinforced by four cables $t$, and finally a thickness of wood $s$ completes the hoop.

In the arrangement for omnibus-wheels (shown in Fig. 4 of the drawings) the first wooden ring $x$ is reinforced internally by a metallic ring $x'$, in which is the cable $v$. Between the ring $x$ and the ring $u$ are metallic rings $u'$, engaging in grooves, as shown, and similarly for the other wooden rings except the last, which does not have any.

The forms, details, accessories, materials, and dimensions of my tire can be modified without in any way departing from the nature of my invention.

I can also make my vibrator ring or hoop of any suitable elastic material, such as metals, wood, vegetable material, &c.

I claim—

1. An improved wheel-tire comprising the ring of wood $f$ for receiving the wheel-spokes, a metallic rim or felly $a$ resting against said ring $f$ and having grooves in its inner face, an india-rubber cover having its edges extending around the edges of the rim $a$ and seated in said grooves, and a vibrator-ring within the cover $b$ for distending the same, substantially as described.

2. An improved wheel-tire, comprising the ring of wood $f$ for receiving the wheel-spokes, a metallic rim or felly $a$ resting against said ring $f$ and having grooves in its inner face, an india-rubber cover having its edges extending around the edges of the rim $a$ and seated in said grooves, and a vibrator-ring within the cover $b$ for distending the same, said vibrator-ring being composed of a plurality of strips or layers and a channeled strip or ring, with a metallic ring of circular cross-section resting in said channel, substantially as described.

The foregoing specification of my improvements in and relating to elastic tires signed by me this 31st day of December, 1897.

JULES NOËL DAGES.

Witnesses:
EDWARD P. MACLEAN,
MAURICE HENRI PIGNET.